United States Patent
Kaushal et al.

(10) Patent No.: US 9,746,849 B2
(45) Date of Patent: Aug. 29, 2017

(54) METHOD AND APPARATUS FOR AUTONOMOUS TOOL PARAMETER IMPACT IDENTIFICATION SYSTEM FOR SEMICONDUCTOR MANUFACTURING

(71) Applicant: Tokyo Electron Limited, Tokyo (JP)

(72) Inventors: Sanjeev Kaushal, San Jose, CA (US); Sukesh Janubhai Patel, Cupertino, CA (US); Wolfgang Polak, Sunnyvale, CA (US); Aaron Archer Waterman, Mountain View, CA (US); Orion Wolfe, Oakland, CA (US)

(73) Assignee: TOKYO ELECTRON LIMITED, Tokyo (JP)

( * ) Notice: Subject to any disclaimer, the term of this patent is extended or adjusted under 35 U.S.C. 154(b) by 680 days.

(21) Appl. No.: 13/673,306

(22) Filed: Nov. 9, 2012

(65) Prior Publication Data

US 2014/0135970 A1 May 15, 2014

(51) Int. Cl.
*G05B 19/418* (2006.01)
*G06N 99/00* (2010.01)

(52) U.S. Cl.
CPC .......... *G05B 19/41875* (2013.01); *G05B 2219/32187* (2013.01); *G06N 99/005* (2013.01); *Y02P 90/22* (2015.11)

(58) Field of Classification Search
None
See application file for complete search history.

(56) References Cited

U.S. PATENT DOCUMENTS

| 5,351,202 | A | * | 9/1994 | Kurtzberg | ........ G05B 19/41875 700/108 |
| 7,401,066 | B2 | | 7/2008 | Beinglass et al. | |
| 7,844,559 | B2 | | 11/2010 | Lam et al. | |
| 8,285,414 | B2 | | 10/2012 | Aharoni et al. | |
| 2009/0240366 | A1 | * | 9/2009 | Kaushal et al. | ............. 700/110 |

OTHER PUBLICATIONS

International Search Report and Written Opinion for International Application No. PCT/US13/59715, dated Apr. 7, 2014, 20 pages.
Taiwanese Office Action dated Mar. 20, 2017 for Taiwanese Application Serial No. 102133453, 14 pages (with English translation).

* cited by examiner

*Primary Examiner* — Mohammad Ali
*Assistant Examiner* — Saad M Kabir
(74) *Attorney, Agent, or Firm* — Amin, Turocy & Watson, LLP

(57) ABSTRACT

A system and method autonomously determines the impact of respective tool parameters on tool performance in a semiconductor manufacturing system. A parameter impact identification system receives tool parameter and performance data for one or more process runs of the semiconductor fabrication system and generates a separate function for each tool parameter characterizing the behavior of a tool performance indicator in terms of a single one of the tool parameters. Each function is then scored according to how well the function predicts the behavior of the tool performance indicator, or based on a determined sensitivity of the tool performance indicator to changes in the single tool parameter. The tool parameters are then ranked based on these scores, and a reduced set of critical tool parameters is derived based on the ranking. The tool performance indicator can then be modeled based on this reduced set of tool parameters.

19 Claims, 17 Drawing Sheets

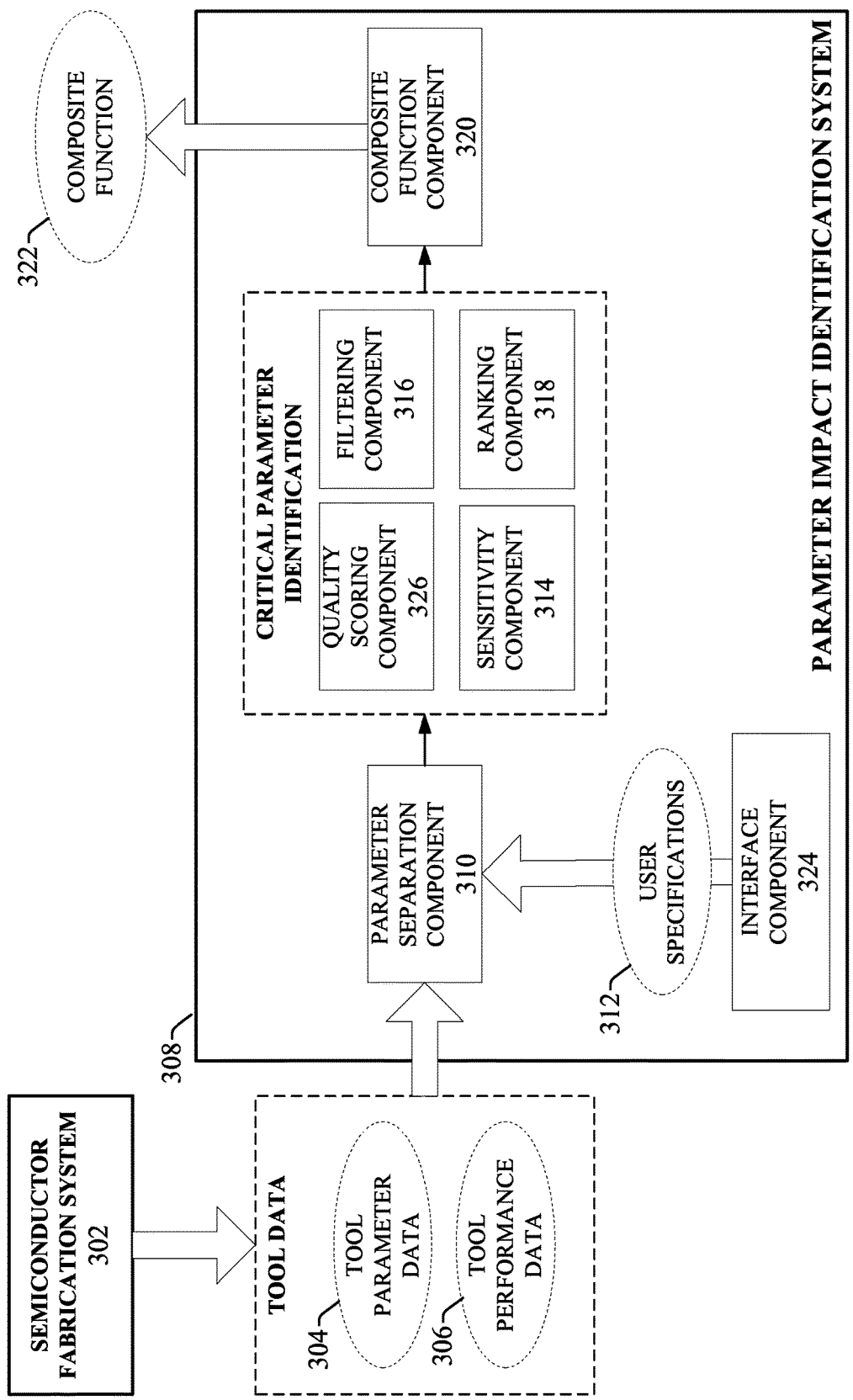

TOOL PERFORMANCE INDICATOR — 400

- ☐ WAFER THROUGHPUT
- ☐ INCOMING CD
- ☒ MACHINE DOWNTIME
- ☐ DEPOSITED THICKNESS
- ☐ MACHINE UPTIME
- ☐ REFRACTIVE INDEX
- ☐ REPAIR COST
- ...

TOOL PARAMETERS — 500

| Metrology | Sensor Readings | Tool Performance |
|---|---|---|
| ☐ INCOMING CD | ☐ CHAMBER #12 PRESSURE | ☐ FOCUS RING AGE (USE COUNT) |
| ☒ DEPOSITED THICKNESS | ☐ CHAMBER #12 GAS FLOW | ☐ PROCESSING TIME |
| ☐ REFRACTIVE INDEX | ☐ CHAMBER #12 TEMPERATURE | ☐ SET-UP TIME |
| ... | ... | ☐ WAFER UNLOAD TIME |
| | | ... |

FIG. 5

METHOD AND APPARATUS FOR AUTONOMOUS TOOL PARAMETER IMPACT IDENTIFICATION SYSTEM FOR SEMICONDUCTOR MANUFACTURING

TECHNICAL FIELD

The subject invention relates generally to techniques for determining relative impacts of tool parameters on selected tool performance indicators of a semiconductor manufacturing system.

BACKGROUND

Progressive technological evolution of electronics and computing devices motivates advances in semiconductor technology. Growing consumer demand for smaller, higher performance, and more efficient computer devices and electronics has led to down-scaling of semiconductor devices. To meet device demand while restraining costs, silicon wafers upon which semiconductor devices are formed have increased in size.

Fabrication plants working with large wafer sizes utilize automation to implement and control wafer processing. Such plants can be capital intensive, and accordingly, it is desirable to maintain highly efficient operation of fabrication equipment to minimize downtime and maximize yields. To facilitate these goals, measurement equipment is often employed to monitor fabrication equipment during wafer processing and to acquire measurement information on both the equipment and the processed wafer. The measurement information can then be analyzed to optimize fabrication equipment.

According to an example, measurement information can include tool level information, which indicates a state or condition of fabrication equipment or a portion thereof, wafer metrology information specifying physical and/or geometric conditions of wafers being processed, electrical text information, and the like. In addition, spectroscopic data (e.g., spectral line intensity information), can be gathered to facilitate identification of etch endpoints by process engineers. However, in conventional fabrication environments, various measurement data is handled independently of one another for different purposes. As such, inter-relationships among various measurement data are not leveraged for advanced optimization of fabrication processes.

The above-described deficiencies of today's semiconductor fabrication measurement and optimization systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic and general understanding of some aspects of exemplary, non-limiting embodiments described herein. This summary is not an extensive overview nor is intended to identify key/critical elements or to delineate the scope of the various aspects described herein. Instead, the sole purpose of this summary is to present some concepts in a simplified form as a prelude to the more detailed description of various embodiments that follow.

One or more embodiments of the present disclosure relate to techniques for autonomously identifying relative impacts of tool parameter on selected tool performance indicators of a semiconductor fabrication system. To this end, a parameter impact identification system is provided that can leverage measured tool parameter data and tool performance data to identify the most critical tool parameters that influence a particular tool performance metric. The parameter impact identification system can also rank these critical parameters in order of their relative impact on the selected tool performance metric, providing maintenance personnel with a useful guide for identifying which critical tool parameters should be the focus of maintenance efforts to optimize the selected tool performance metric.

The parameter impact identification system can determine the relative impacts of the respective tool parameters by separately analyzing each tool parameter and, for each parameter, attempting to predict the behavior of a selected tool performance indicator using the separated parameter. This reduces the complex dimensionality of semiconductor tool parameters into a single-input-single-output (SISO) problem, in which the tool performance indicator is described as a function of only a single tool parameter. The impact of each parameter on the performance indicator can then be determined based on an analysis of the resulting functions (e.g., by calculating a derivative of each function, by determining a predictive accuracy at each function, etc.), and the tool parameters ranked according to relative impact.

In some embodiments, the parameter impact identification system can also generate a function that characterizes the selected tool performance indicator in terms of only the most important tool parameters as determined by the aforementioned ranking. By eliminating tool parameters having negligible impact on the performance indicator, the resulting function can greatly simplify the problem space for the end user and allow sharper focus on the critical tool parameters.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 3 is a block diagram illustrating processing functions performed by an exemplary parameter impact identification system.

FIG. 4 illustrates an exemplary interface for selecting a tool performance indicator to be analyzed.

FIG. 5 illustrates an exemplary interface for selecting one or more tool parameters that are to be considered by parameter impact identification system.

DETAILED DESCRIPTION

Figure 1:
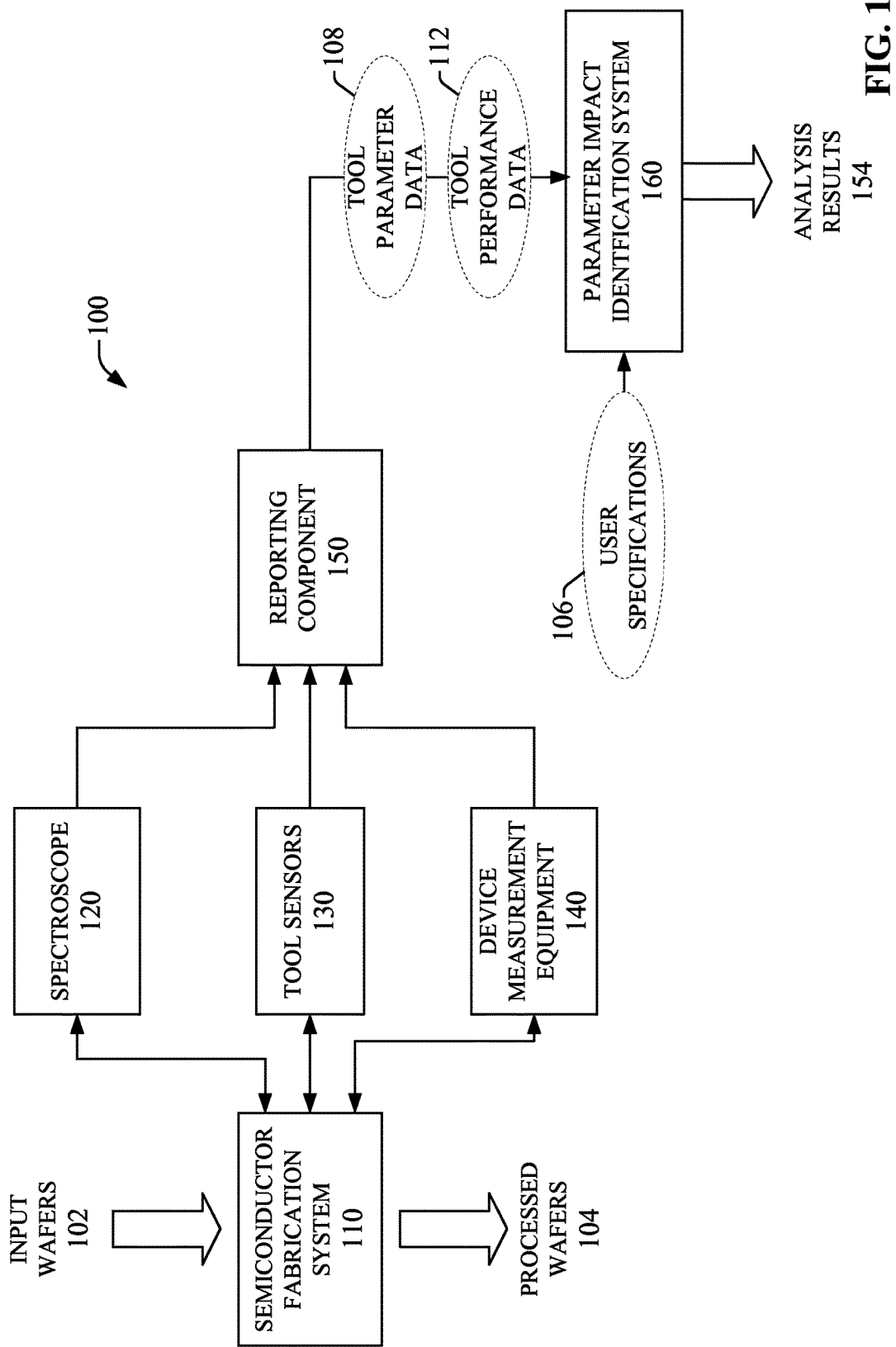
FIG. 1 is block diagram illustrating an exemplary system for collecting and analyzing information relating to semiconductor production.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present innovation.

As used in the subject specification and drawings, the terms "object," "module," "interface," "component," "system," "platform," "engine," "selector," "manager," "unit," "store," "network," "generator" and the like are intended to refer to a computer-related entity or an entity related to, or that is part of, an operational machine or apparatus with a specific functionality; such entities can be either hardware, a combination of hardware and firmware, firmware, a combination of hardware and software, software, or software in execution. In addition, entity(ies) identified through the foregoing terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the term "set" as employed herein excludes the empty set; e.g., the set with no elements therein. Thus, a "set" in the subject disclosure includes one or more elements or entities. As an illustration, a set of components includes one or more components; a set of variables includes one or more variables; etc.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is block diagram illustrating an exemplary system 100 for collecting and analyzing information relating to semiconductor production. As shown in FIG. 1, a semiconductor fabrication system 110 can receive input wafers 102 and output processed wafers 104. In an exemplary, non-limiting embodiment, semiconductor fabrication system 110 can be an etch tool that removes unmasked material from input wafers 102 via an etching process (e.g., wet etch, dry etch, plasma etching, etc.) to generate processed wafers 104 having cavities and features formed thereon. Semiconductor fabrication system 110 can also be a deposition tool (e.g., atomic layer deposition, chemical vapor deposition, etc.) that deposits material onto input wafers 102 to yield processed wafers 104.

A variety of measurement devices, such as spectroscope 120, tool sensors 130, and device measurement equipment 140, can monitor the process performed by semiconductor fabrication system 110 to acquire disparate information relating to various aspects, conditions, or results of the process. As an example, spectroscope 120 can acquire spectral intensity information which includes a set of intensities for respective wavelengths or spectral lines observable by spectroscope 120. Spectral intensity information can be time-series data such that spectroscope 120 measures intensities for respective wavelengths at regular intervals (e.g., every second, every 2 seconds, every 100 milliseconds, etc.). Spectroscope 120 can also correlate spectral intensity information with wafer IDs associated with specific wafers processed by semiconductor fabrication system 110. Accordingly, spectroscope 120 can acquire spectral intensity information individually for each wafer processed by semiconductor fabrication system 110.

Tool sensors 130 can monitor and measure tool operation characteristics while semiconductor fabrication system 110 processes input wafers 102 and generate corresponding sensor information. Tool sensor information, similar to spectral intensity information measured by spectroscope 120, can be time-series data correlated on a per-wafer basis. Tool sensor information can include measurements from a variety of sensors. Such measurements can include, but are not limited to, pressures within one or more chambers of semiconductor fabrication system 110, gas flows for one or more distinct gases, temperatures, upper radio frequency (RF) power, elapsed time since last wet-clean, age of tool parts, and the like.

Device measurement equipment 140 can measure physical and geometric properties of wafers and/or features fabricated on wafers. For instance, device measurement equipment 140 can measure development inspection critical dimension (DI-CD), final inspection critical dimension (FI-CD), etch bias, thickness, and so forth, at predetermined locations or regions of wafers. The measured properties can be aggregated on a per-location, per-wafer basis and output as device measurement information. Properties of wafers are typically measured before processing or after processing. Accordingly, device measurement information is typically time-series data acquired at a different interval as compared with spectral intensity information and tool sensor information.

By leveraging data collected from measurement devices 120, 130, and 140 during wafer production, a large number of tool performance indicators can be measured or derived for semiconductor fabrication system 110. Exemplary performance indicators can include overall production statistics, such as wafer throughput, system downtime, system uptime, etc. Performance indicators can also include metrology outputs, or measured characteristics of the resulting semiconductor wafers produced by the system, including but not limited to edge bias, deposition thickness, particle count (e.g., level of contamination), sidewall angle, or other such measured characteristics. Some performance indicators can also consider data external to the semiconductor fabrication system 110. For example, repair costs associated with the system can be calculated based in part on recorded financial or billing data obtained from one or more business-level server.

Behavior of a given tool performance indicator is typically a function of one or more tool parameters measured for the system. Tool parameters having an impact on tool performance can include, for example, chamber pressures, temperatures, RF power, gas flows, or other parameters measured during operation of the tools. Other tool parameters that can affect tool performance include tool operational characteristics, such as age of parts, processing times, tool set-up times, wafer load or unload times, etc. Some tool performance indicators can also be a function of one or more product metrology inputs (e.g., incoming critical dimension, deposited thickness, refractive index of material, or other such metrology values).

Since tool performance is largely a function of one or more tool parameters such as those described above, knowledge of which tool parameters have the largest impact on a given tool performance metric would afford users a greater degree of control over tool performance and help to maintain tool performance indicators within desired limits. However, since tool parameter data is often only loosely correlated with tool performance data, it is difficult to assess which tool parameters have the highest impact on these tool performance metrics. This information would be useful to equipment owners in connection with identifying where maintenance efforts should be focused.

To address these issues, a parameter impact identification system 160 is provided that leverages tool parameter data and tool performance data to autonomously identify which tool parameters have the largest impact on a selected tool performance indicator. Parameter impact identification system 160 can also characterize tool performance indicators in terms of a reduced number of tool parameters determined to have the most influence on the performance indicator, thereby simplifying analysis by reducing dimensional complexity.

Parameter impact identification system 160 can receive, as input, tool parameter data 108 and tool performance data 112. In one or more embodiments, this input data can be derived from tool process logs that record parameter and performance data measured during respective runs of semiconductor fabrication system 110. Tool process logs can include measurement data from one or more of the spectroscope 120, tool sensors 130, or device measurement equipment 140. Measurements recorded in such tool process logs can include, but are not limited to, sensor readings (e.g., pressures, temperatures, power, etc.), maintenance related readings (e.g., age of focus ring, age of mass flow controller, time since last performed maintenance, time since last batch of resist was loaded, etc.), and/or tool and performance statistics (e.g., time to process wafer, chemical consumption, gas consumption, etc.).

In an exemplary scenario, a tool process log can be generated by a reporting component 150 at the end of each process run of semiconductor fabrication system 110. At the end of a process run, data from one or more of the spectroscope 120, tool sensors 130, or device measurement equipment 140 can be provided to reporting component 150, which aggregates the collected data in a tool process log for the run. A tool process log can correspond to a single semiconductor wafer processed during the run, or a batch of semiconductors fabricated during the run. The tool process logs can then be stored for reporting or archival purposes. Tool parameter data 108 and tool performance data 112 from the tool process logs can be provided to parameter impact identification system 160 either manually by an operator or automatically by reporting component 150 or a related device.

Although the foregoing example describes tool parameter data 108 and tool performance data 112 as being retrieved or extracted from tool process logs, it is to be appreciated that this data may also be provided to parameter impact identification system 160 by other means. For example, in some embodiments, all or a subset of tool parameter data 108 or tool performance data 112 may be provided directly to parameter impact identification system 160 from devices 120, 130, or 140.

Tool parameter data 108 can comprise values measured for one or more tools during operation (e.g., pressures, temperatures, power, gas flows, etc.), operational performance statistics (e.g., part age or usage count, processing times, set-up times, load or unload times, etc.), or other such tool parameters. Tool performance data 112 can include measured characteristics of the finished semiconductor wafers which are impacted by one or more of the tool parameters (e.g., etch bias, deposition thickness, particle count, sidewall angle, etc.), performance data for the tool itself (e.g., wafer throughput, downtime, uptime, repair costs, etc.), or other such metrics indicative of the tool's operational performance.

Parameter impact identification system 160 processes tool parameter data 108 and tool performance data 112 in view of user specifications 106 defined by the user. User specifications 106 can specify one or more processing preferences, including but not limited to selection of which tool performance indicator is to be analyzed, which tool parameters are to be considered (e.g., which tool parameters are to be correlated with the selected tool performance indicator), a preferred number of top tool parameters to be identified by the system, a preferred learning methodology (e.g., simulated annealing, symbolic regression, etc.), or other user preferences. Parameter impact identification system 160 analyzes tool parameter data 108 and tool performance data 112 in view of user specifications 106 to generate analysis results 154, to be described in more detail below. In general, analysis results 154 assist in identifying critical tool parameters having the greatest impact on a given tool performance indicator, characterizing the selected tool performance indicator as a function of the critical tool parameters, and predicting future values of the tool performance indicator given the identified tool parameters.

Figure 2:
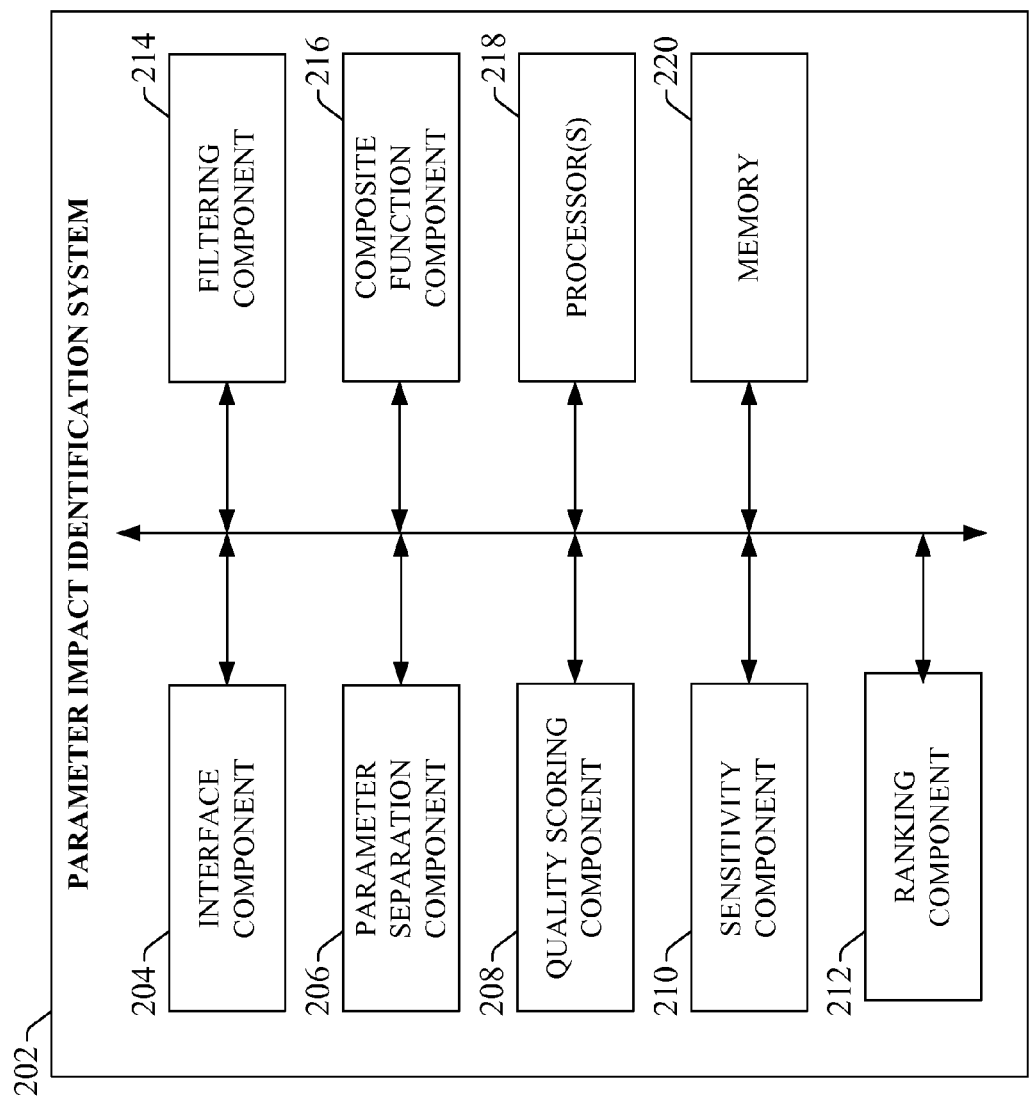
FIG. 2 is a block diagram of an exemplary parameter impact identification system that can autonomously identify tool parameters that impact selected tool performance metrics.

FIG. 2 is a block diagram of an exemplary parameter impact identification system that can autonomously identify tool parameters that impact selected tool performance behaviors. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Parameter impact identification system 202 can include an interface component 204, a parameter separation component 206, a quality scoring component 208, a sensitivity component 210, a ranking component 212, a filtering component 214, a composite function component 216, one or more processors 218, and memory 220. In various embodiments, one or more of the interface component 204, parameter separation component 206, quality scoring component 208, sensitivity component 210, ranking component 212, filtering component 214, composite function component 216, one or more processors 218, and memory 220 can be electrically and/or communicatively coupled to one another to perform one or more of the functions of the parameter impact identification system 202. In some embodiments, components 204, 206, 208, 210, 212, 214, and 216 can comprise software instructions stored on memory 220 and executed by processor(s) 218. The parameter impact identification system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

Interface component 204 can be configured to receive input from and provide output to a user of parameter impact identification system 202. For example, interface component 204 can render an input display screen to a user that prompts for user specifications, and accepts such specifications from the user via any suitable input mechanism (e.g., keyboard, touch screen, etc.). Parameter separation component 206 can be configured to generate functions that isolate the effects of each individual tool parameter to determine the impact of each tool parameter on a selected tool performance indicator. Each function attempts to predict the behavior of the selected tool performance indicator as a function of a single tool parameter. Quality scoring component 208 can be configured to score each tool parameter according to how well the parameter's function predicts the actual behavior of the tool performance indicator. Sensitivity component 210 can be configured to determine a sensitivity of the selected tool performance indicator to each tool parameter based in part on the functions generated by parameter separation component 206. Ranking component 212 can be configured to rank the tool parameters according to their respective impact on the tool performance indicator being analyzed (e.g., as determined by quality scoring component 208 or sensitivity component 210). Filtering component 214 can be configured to eliminate from consideration one or more tool parameters determined to have the least impact on the tool performance indicator. Composite function component 216 can be configured to generate a function describing the tool performance indicator as a function of the reduced set of tool parameters after filtering component 214 has eliminated the least influential parameters. The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

FIG. 3 is a block diagram illustrating processing functions performed by an exemplary parameter impact identification system. As described above in connection with FIG. 1, parameter impact identification system 308 receives, as input, tool parameter data 304 and tool performance data 306 associated with one or more runs of semiconductor fabrication system 302. Tool parameter data 304 and tool performance data 306 can be provided automatically to parameter impact identification system 308 (e.g., by reporting component 150 of FIG. 1) or provided to the system manually by a user via interface component 324.

In addition to tool parameter data 304 and tool performance data 306, parameter impact identification system 308 also receives user specifications 312 from a user via interface component 324. As noted above, user specifications 312 can specify which tool performance indicator is to be analyzed, which tool parameters are to be considered in terms of their respective impact on the selected tool performance indicator, a selected number of top tool parameters to be identified by the system (or alternatively, a selected number of least influential tool parameters to be identified and eliminated), a preferred learning methodology (e.g., simulated annealing, symbolic regression, etc.), or other user preferences.

Exemplary non-limiting interfaces for defining one or more user specifications are described in connection with FIGS. 4 and 5. Exemplary interfaces 400 and 500 can be rendered to a user via interface component 324. Exemplary interface 400 of FIG. 4 can be used to select a tool performance indicator to be analyzed by the system. Exemplary interface 500 of FIG. 5 can be used to select one or more tool parameters that are to be considered by parameter impact identification system 308. That is, parameter impact identification system 308 will assess the relative impacts of the tool parameters selected via exemplary interface 500 on the tool performance indicator selected via exemplary interface 400. Exemplary interfaces 400 and 500 allow tool performance indicators and tool parameters to be selected using checkboxes; however, any suitable technique for entering tool performance and tool parameter specifications can be employed and are within the scope of one or more embodiments of this disclosure.

Figure 6:
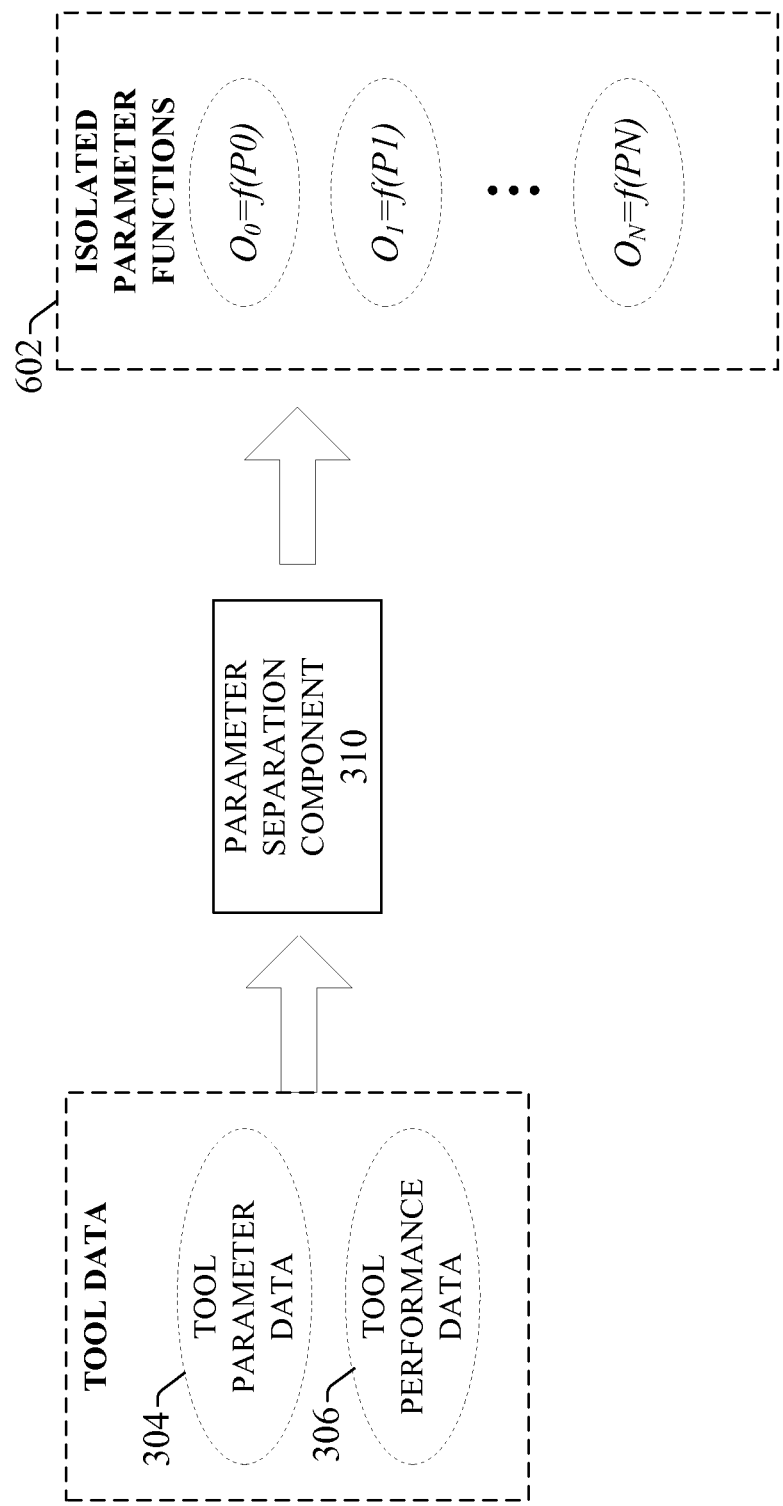
FIG. 6 illustrates generation of a set of isolated parameter functions given a set of tool parameter and performance data.

Returning now to FIG. 3, processing operations performed on tool parameter data 304, tool performance data 306, and user specifications 312 are described. After tool parameter data 304, tool performance data 306, and user specifications 312 are provided to parameter impact identification system 308, parameter separation component 310 separates each tool parameter (e.g., each tool parameter selected for analysis via user specifications 312) and iteratively attempts to predict the behavior of the selected tool performance indicator using each separated tool parameter individually. This process is described in more detail with reference to FIG. 6. In the present example, tool parameters P0-PN are to be considered, where N is an integer greater than zero. Accordingly, tool parameter data 304 comprises parameter data measured for each of the tool parameters P0-PN for one or more process runs of semiconductor fabrication system 302. Tool performance data 306 comprises corresponding measurement data for a selected tool performance indicator for the same one or more process runs.

Parameter separation component 310 leverages tool parameter data 304 and tool performance data 306 to generate a set of isolated parameter functions 602, where each function corresponds to a single one of the tool parameters P0-PN. Each of the isolated parameter functions 602 characterizes the predicted behavior of the tool performance indicator (represented as output O) in terms of a single tool parameter. The resulting isolated parameter functions corresponding to tool parameters P0-PN can be represented as follows:

$$O = f_0(P0) \quad (1)$$

$$O = f_1(P1) \quad (2)$$

...

$$O = f_{N-1}(PN-1) \quad (3)$$

$$O = f_N(PN) \quad (4)$$

These functions establish non-linear functional relationships between the selected tool performance indicator (output O) and each tool parameter P0-PN. For the equations above, the tool performance indicator output O will be the same for each function, but will be described by different functions $f_0$-$f_N$ which are, respectively, functions of the tool parameters P0-PN. Thus, parameter separation component 310 reduces the complex dimensionality of the semiconductor tool parameters into a set of single-input-single-output (SISO) sub-problems.

Parameter separation component 310 can utilize any suitable learning method to learn the non-linear functional relationships $f$ for each of the parameters P0-PN, including but not limited to genetic programming, symbolic regression, simulated annealing, neural network, or other such non-linear functional identification systems. In one or more embodiments, users may choose a preferred learning method to be used by parameter separation component 310 to derive functions $f_0(P0)$ ... $f_N(PN)$. In such embodiments, selection of a preferred learning method can be made via interface component 324. Parameter separation component 310 can be also configured to iteratively update functions $f_0(P0)$ ... $f_N(PN)$ as new tool parameter data 304 and/or tool performance data 306 is received.

Returning now to FIG. 3, after parameter separation component 310 has established the functional relationships $f_0(P0)$ ... $f_N(PN)$ describing the function relationships between each tool parameter and the tool performance indicator, the resulting functions can be submitted for critical parameter identification. To facilitate identification of the critical tool parameters having the greatest impact on the selected tool performance indicator, parameter impact identification system 308 can utilize one or more of a quality scoring component 326, a sensitivity component 314, a filtering component 316, and a ranking component 318.

Figure 7:
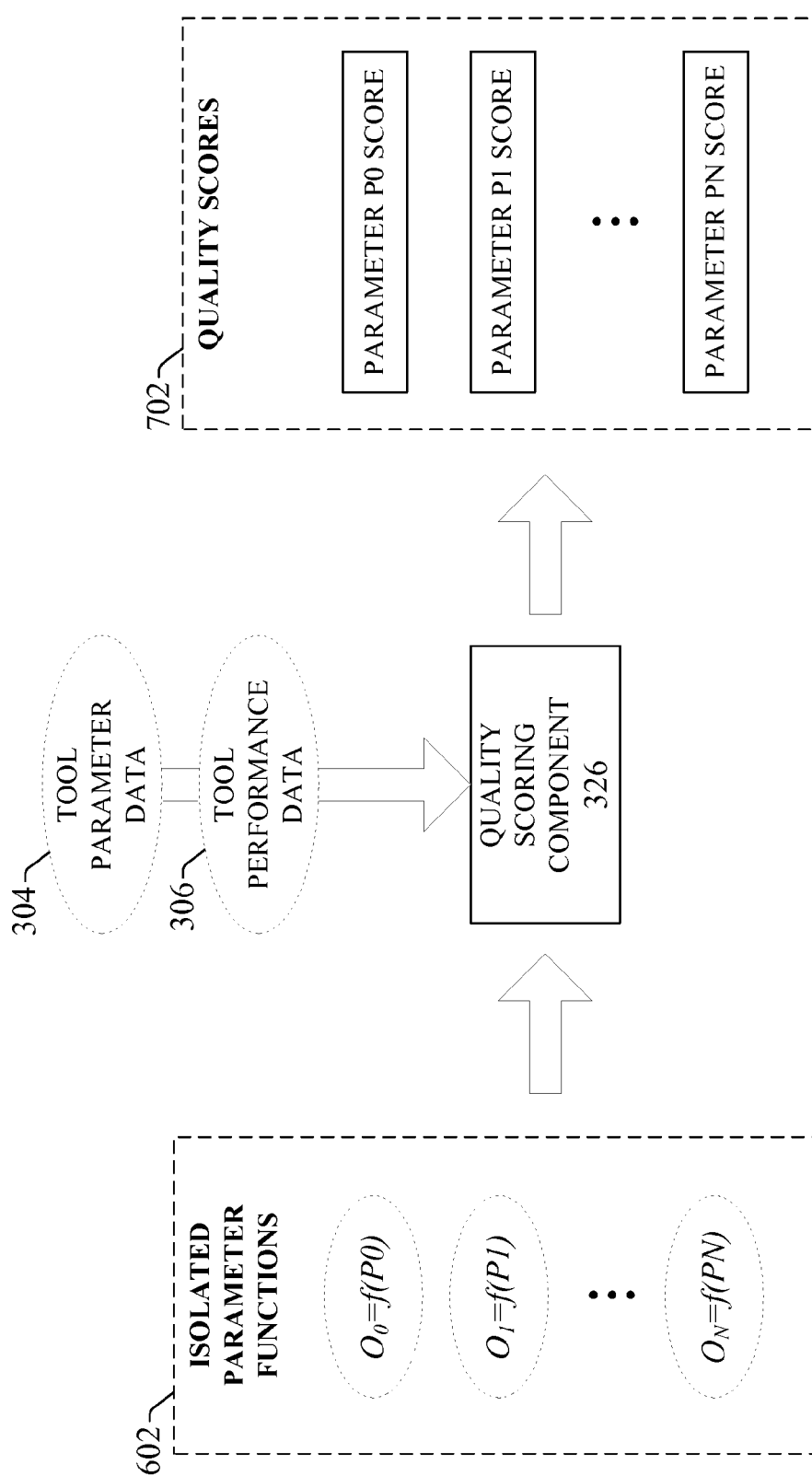
FIG. 7 illustrates assignment of quality scores to respective tool parameters based on isolated parameter functions.

Quality scoring component 326 is described in more detail with reference to FIG. 7. Quality scoring component 326 can determine a quality score for each of the isolated parameter functions $f_0(P0)$ ... $f_N(PN)$ by comparing a predicted output O of each function with actual tool performance data 306. The resulting set of quality scores 702 indicate how well the tool performance behavior predicted by each tool parameter's isolated function matches the actual tool performance data 306. For example, when new tool parameter data 304 for parameters P0-PN is received after a new process run of semiconductor fabrication system 302, quality scoring component 326 can run the new value of parameter P0 through that parameter's corresponding isolated function $f_0(P0)$ to determine the value of the tool performance indicator predicted by the parameter's isolated function (the value O). Quality scoring component 326 can then compare this predicted value O with the actual value indicated by tool performance data 306 and assign a quality score to parameter P0 indicating how closely predicted value O matches the actual value of the tool performance indicator. Quality scoring component 326 repeats this scoring process for each of the remaining parameters P1-PN to derive a set of quality scores 702. In one or more embodiments, quality scoring component 326 can update the quality scores 702 in an iterative fashion as new process run data is received.

Quality scores 702 can provide a metric for determining relative degrees of impact each parameter P0-PN has on the tool performance indicator being analyzed. In general, a tool parameter whose isolated parameter function predicts a tool performance output O that closely matches the actual tool performance indicator is likely to have a relatively high degree of influence on the tool performance indicator. Conversely, a tool parameter whose isolated function repeatedly fails to closely predict the actual tool performance is less likely to have a correlation with the tool parameter indicator. Accordingly, quality scores 702 reflect these relative degrees of impact.

Figure 8:
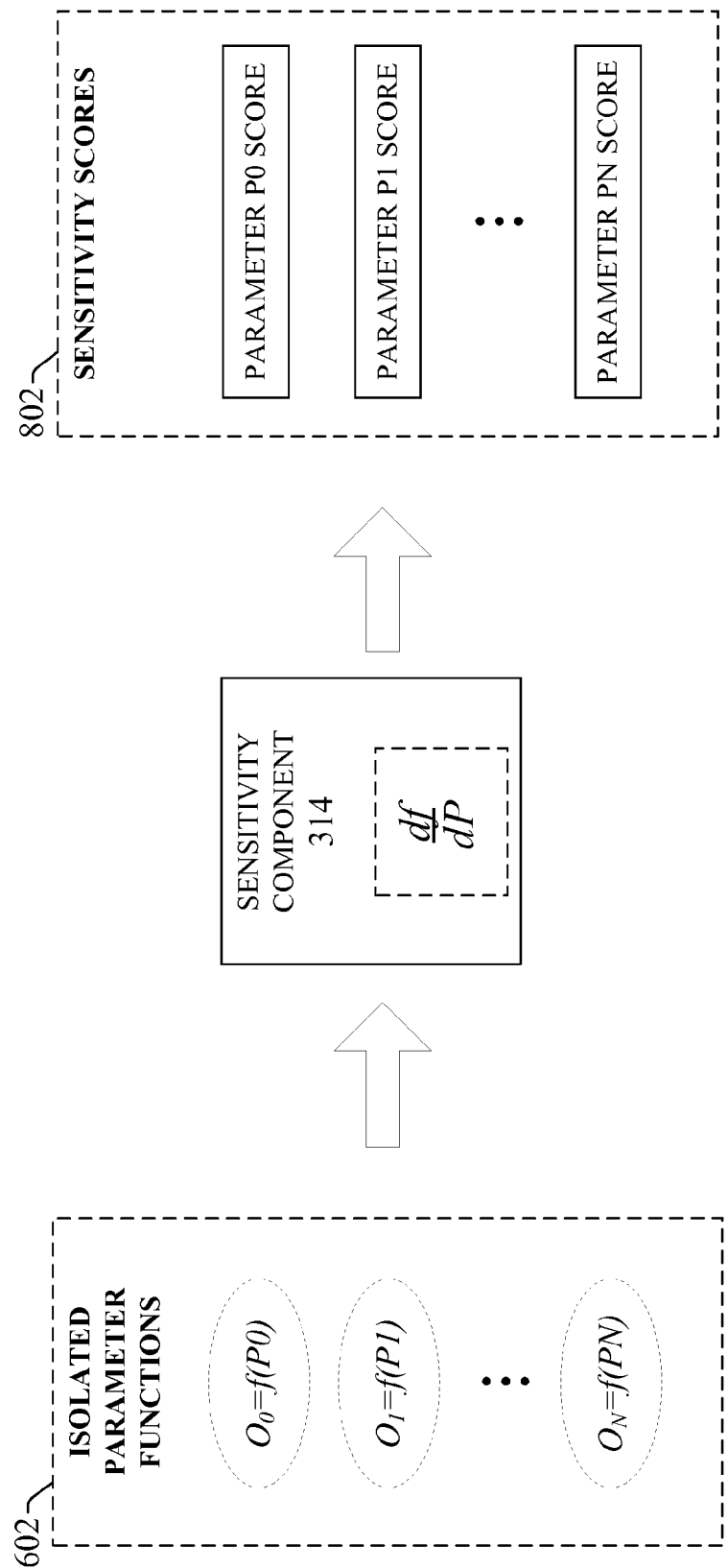
FIG. 8 illustrates assignment of sensitivity scores to respective tool parameters based on isolated parameter functions.

Other techniques may be used to determine relative impacts of the tool parameters on the tool performance indicator. For example, some embodiments of parameter impact identification system 308 may include a sensitivity component 314 in addition to or as an alternative to quality scoring component 326. As illustrated in FIG. 8, sensitivity component 314 can assess each isolated parameter functions 602 and assign sensitivity scores 802 to the respective tool parameters P0-PN based on the assessment. Similar to quality scores 702, sensitivity scores 802 indicate relative degrees of impact that each tool parameter has on the tool performance indicator being analyzed. In general, a sensitivity score for a given parameter is a measure of how sensitive the tool performance indicator is to changes in that tool parameter.

In one or more embodiments, sensitivity component 314 can generate the sensitivity scores 802 based in part on numerical or symbolic differentials computed for each isolated parameter function $f_0(P0) \ldots f_N(PN)$. For example, for a given isolated parameter function O=fi(Pi) corresponding to a tool parameter Pi, sensitivity component 314 can use numerical or symbolic differentiation to calculate a differential:

$$\frac{df_i}{dP_i} \quad (5)$$

This differential represents the rate at which the predicted value of the tool performance indicator O changes in response to changes in the tool parameter Pi, and is a measure of how sensitive the tool parameter indicator is to changes in tool parameter Pi. Sensitivity component 314 can generate sensitivity scores 802 based in part on respective differentials computed for each tool parameter P0-PN.

Since parameters P0-PN will typically represent different types of tool parameters represented by different engineering units and having different operational ranges, it may be necessary for sensitivity component 314 to normalize the differentials in some manner in order to accurately compare the respective sensitivities. Sensitivity component 314 may also consider each tool parameter's valid operating range when deriving a sensitivity score based on the differential. For example, if a given tool parameter has known upper and lower operating limits, sensitivity component 314 may consider only the portion of the parameter's differential curve between these two operating limits when computing the parameter's sensitivity score. In general, any suitable technique or methodology for deriving a sensitivity score for a tool parameter based on a differential of the parameter's isolated parameter function is within the scope of one or more embodiments of this disclosure.

One or more embodiments of parameter impact identification system 308 may score each parameter P0-PN using only one of the quality scoring component 326 or the sensitivity component 314. Other embodiments may include both the quality scoring component 326 and the sensitivity component, and generate scores for each parameter based on a composite of the quality score and the sensitivity score. In the latter scenario, parameter impact identification system 308 can combine the quality and sensitivity scores using any suitable combining technique. For example, parameter impact identification system 308 may apply a weighing factor to a tool parameter's quality score based on the parameter's sensitivity score (or vice versa). In another example, the two scores may be added together. These combining techniques are only intended to be exemplary, and any suitable technique for generating a composite score based on the quality and sensitivity scores is within the scope of one or more embodiments of this disclosure.

Figure 9:
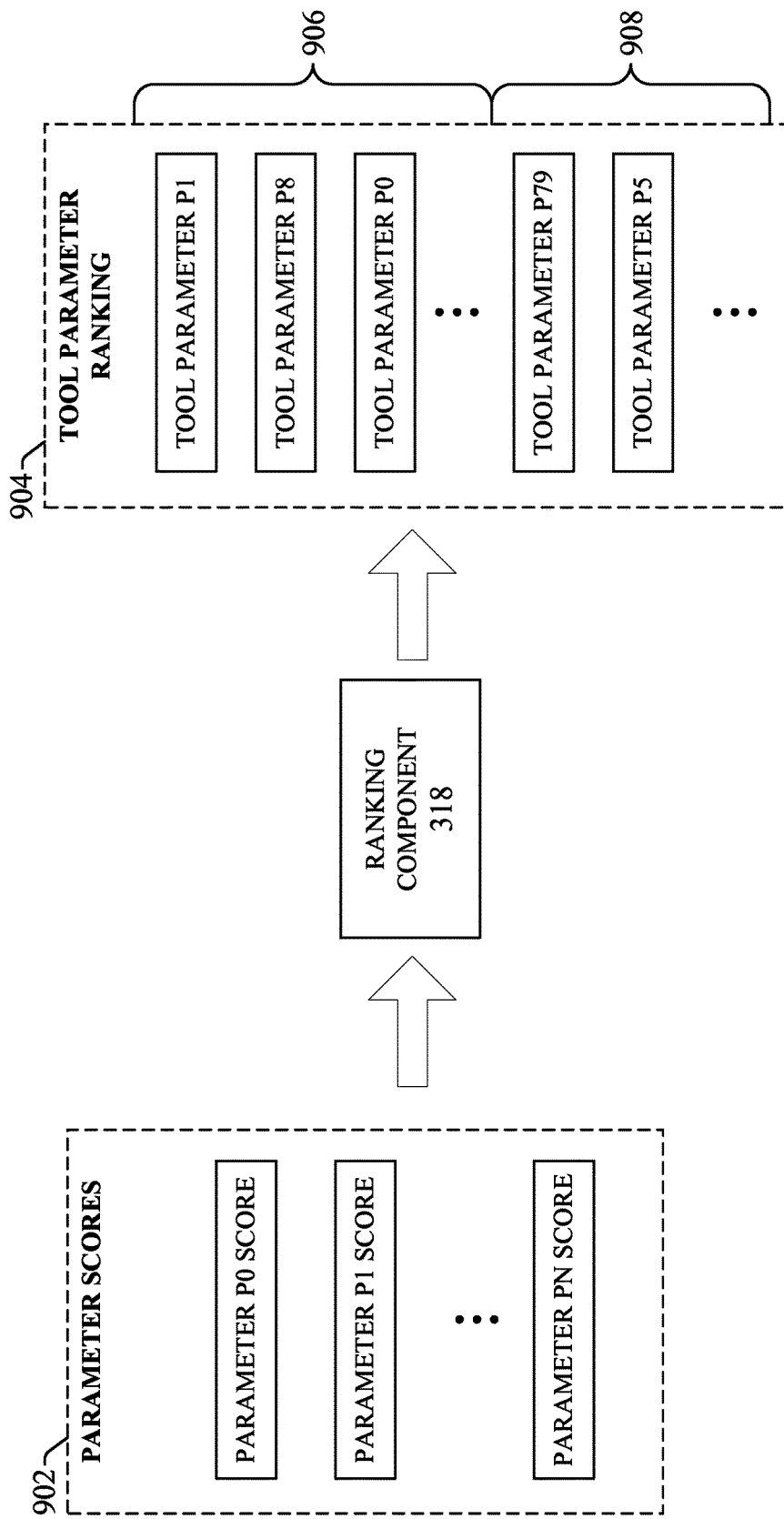
FIG. 9 illustrates ranking of tool parameters according to relative impact on a tool performance indicator.

Once a set of parameter scores has been obtained, ranking component 318 can rank the tool parameters based on these scores. FIG. 9 illustrates an exemplary parameter ranking performed by ranking component 318. Parameter scores 902 for each tool parameter P0-PN can comprise the quality scores, the sensitivity scores, or a composite of both scores as described above. These scores represent relative impact or influence each tool parameter has on the tool performance indicator being analyzed. Based on these scores 902, ranking component 318 ranks parameters P0-PN in order of their impact on the tool performance indicator.

Figure 10:
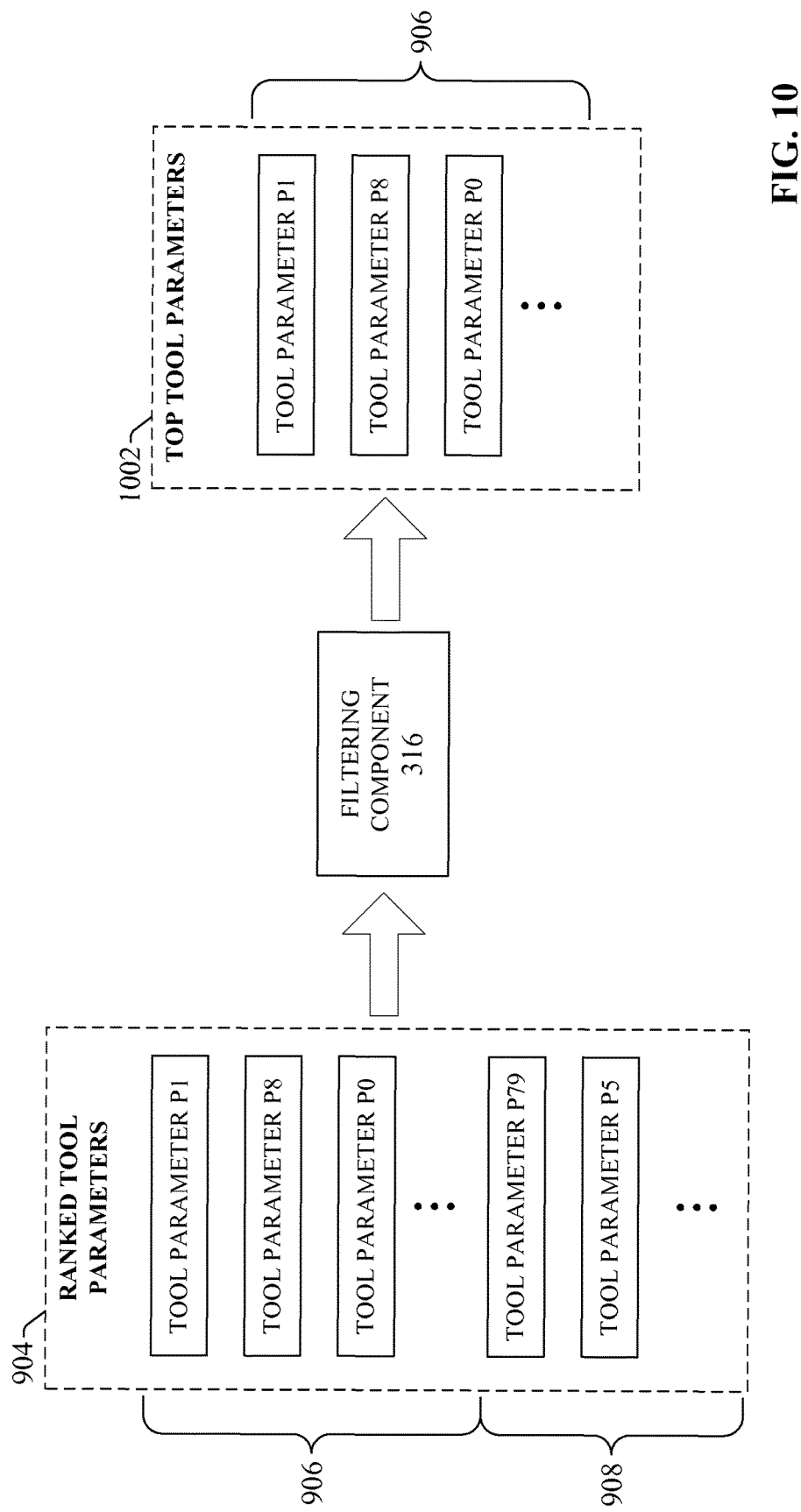
FIG. 10 illustrates filtering of ranked tool parameters to identify a set of critical tool parameters having the highest impact on a tool performance indicator.

The resulting tool parameter ranking 904 can be used to identify a first subset of higher-ranked tool parameters 906 having a significant impact on the tool performance indicator, and a second subset of lower-ranked tool parameters 908 having a negligible or non-existent impact on the tool performance indicator. Based on this determination, parameter impact identification system 308 can reduce the dimensional complexity of tool performance indicator analysis by eliminating the lower-ranked subset of tool parameters 908 whose effect on the tool performance indicator is negligible. Accordingly, filtering component 316 can receive the ranked tool parameters 904 generated by ranking component 318 and eliminate the subset of tool parameters 908 from consideration, as illustrated in FIG. 10. The remaining set of top tool parameters 1002 represent those tool parameters identified as having a non-trivial impact on the tool parameter indicator.

Figure 11:
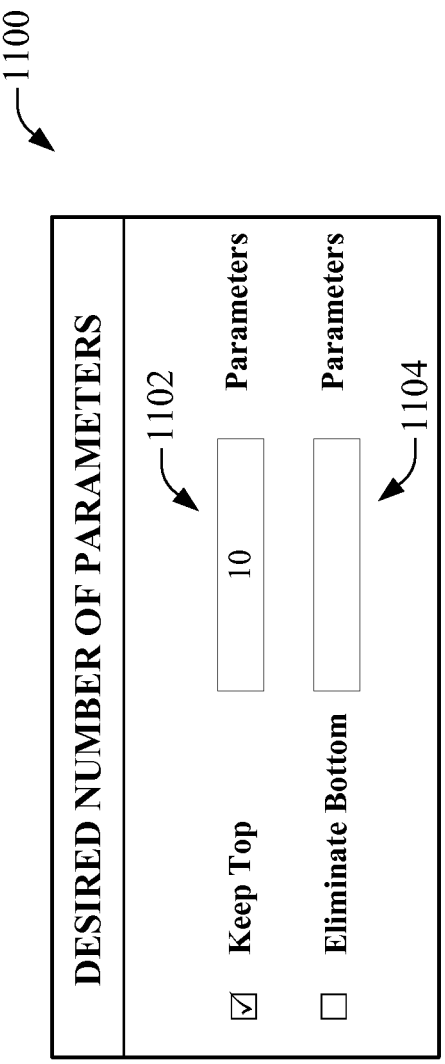
FIG. 11 illustrates an exemplary interface for configuring tool parameter filtering criteria.

One or more embodiments of parameter impact identification system 308 can allow the user to specify a number of bottom-ranking tool parameters to eliminate, or a number of top-ranking tool parameters to maintain. This affords the user control over the degree of dimensional complexity of subsequent analysis. FIG. 11 illustrates an exemplary user interface 1100 for making this selection. Exemplary user interface 1100 can include selectable data entry fields allowing the user to specify a number of top parameters to keep (data field 1102) or a number of bottom parameters to eliminate (data field 1104). Filtering component 316 can use these configuration selections to filter ranked tool parameters 904 accordingly and output the list of top tool parameters 1002.

Figure 12:
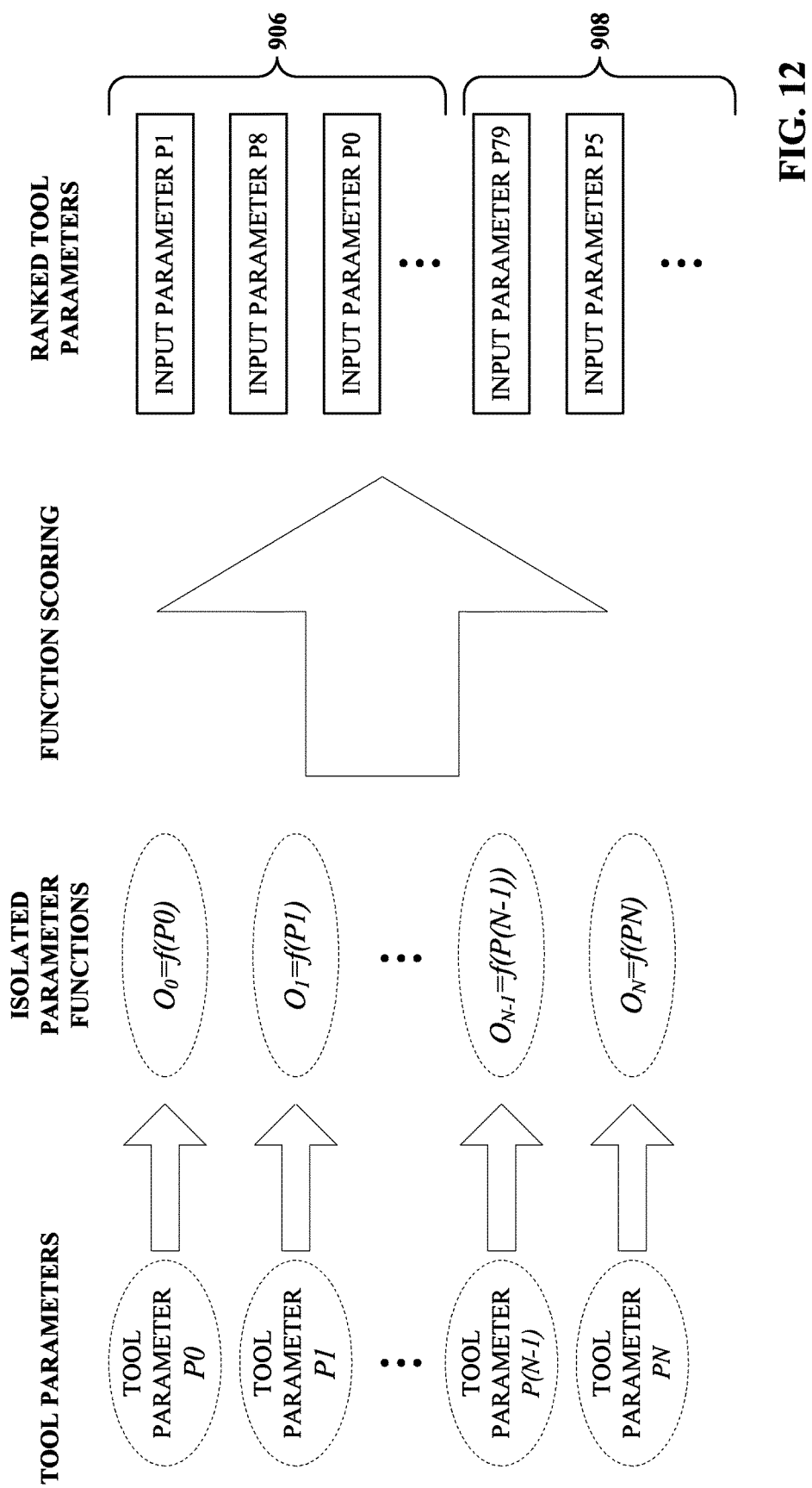
FIG. 12 graphically summarizes identification of critical tool parameters according to one or more embodiments of the parameter impact identification system.

FIG. 12 summarizes the tool parameter identification processing performed by parameter impact identification system 308. For each tool parameter P0-PN being considered, an isolated parameter function is generated that defines a non-linear functional relationship between the tool parameter and a tool performance indicator being analyzed. These functions are represented as $f_0(P0) \ldots f_N(PN)$. Output O represents the predicted value of the selected tool performance indicator as a function of only a single tool parameter. For example, an output O of a function corresponding to parameter Pi represents a predicted value of the tool performance indicator as a function of only tool parameter Pi.

Functions $f_0(P0) \ldots f_N(PN)$ are then scored based on the determined degree of impact or influence the corresponding tool parameters have on the tool performance indicator. Scores can be generated based on how well the respective output O matches the actual measured values for the tool performance indicator, a numeric or symbolic differential calculated for the respective functions $f_0(P0) \ldots f_N(PN)$, or a combination of these techniques. Parameters P0-PN are then ranked based on these scores. Top-ranking parameters 906 can then be identified and maintained for further analysis, while bottom-ranking parameters 908 (representing tool parameters having a trivial or non-existent impact on the tool performance parameter) can be eliminated from consideration.

Once the top ranking tool parameters are identified, parameter impact identification system 308 can render these results to a user (e.g., via interface component 324). By providing users with a list of tool parameters determined to have the greatest influence on the tool performance indicator, parameter impact identification system 308 can provide guidance as to where maintenance efforts should be focused in order to keep the tool performance indicator within desired operating limits.

Figure 13:
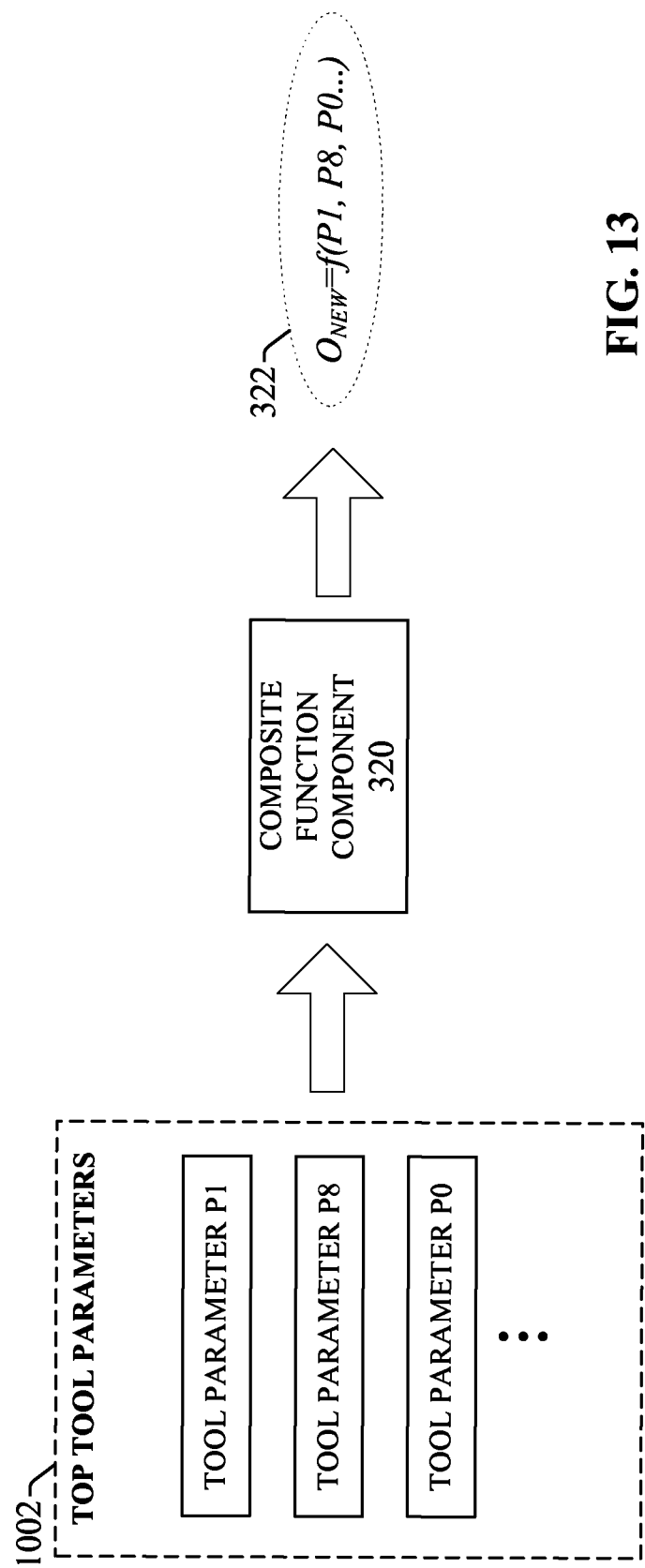
FIG. 13 illustrates generation of a composite function that characterizes a tool performance behavior in terms of a reduced set of critical tool parameters.

In one or more embodiments, parameter impact identification system 308 may perform further analysis on the top-ranked tool parameters to provide additional insight into the relationships between the tool parameters and tool performance indicators. In particular, once the number of tool parameters P0-PN has been reduced to an identified subset of important parameters, output O can be re-learned by the system as a function of this reduced set of tool parameters. To this end, the system may include a composite function component 320 configured to generate a new function that characterizes the tool performance indicator output ($O_{NEW}$) as a function of the most important tool parameters identified by filtering component 316. As illustrated in FIG. 13, composite function component 320 receives top tool parameters 1002 identified by filtering component 316 as having the greatest impact on the tool performance indicator, and learns a new composite function 322 that predicts tool impact parameter output $O_{NEW}$ as a function of the top tool parameters 1002. For example, for a set of top-ranked tool parameters P1, P8, P0 . . . composite function component 320 can generate a composite function 322 having the following general format:

$$O_{NEW} = f(P1, P8, P0 \ldots) \quad (6)$$

Composite function component 320 can employ any suitable non-linear functional identification technique to learn the composite function, including but not limited to genetic programming, symbolic regression, neural networks, least squares fit, or other suitable techniques.

Composite function 322 greatly simplifies analysis of the tool performance indicator by reducing the problem space to a relatively small set of critical tool parameters, allowing users to focus more sharply on those critical parameters. The composite function can be leveraged in a number of ways to facilitate analysis of a selected tool performance aspect with respect to the tool parameters that determine the behavior of this performance aspect. For example, new tool parameter data can be analyzed in view of composite function 322 in order to predict future values of the tool performance indicator. If one or more tool parameter values begin drifting due to part degradation, expected future values of these tool parameters can be run through composite function 322 to determine when the tool performance indicator $O_{NEW}$ is expected to fall outside acceptable performance limits. In this way, composite function 322 can be used as a basis for a near real-time early warning system that identifies when preventative maintenance should be performed and which tool parameters should be the focus of maintenance efforts. Composite function 322 can also be analyzed more generally to provide insight into the relationships between the critical tool parameters and the predicted tool performance indicator $O_{NEW}$. Thus, parameter impact identification system 308 serves as an efficient functional modeling system that reduces the search space for performing functional relationship modeling for a semiconductor fabrication system.

Figure 14:
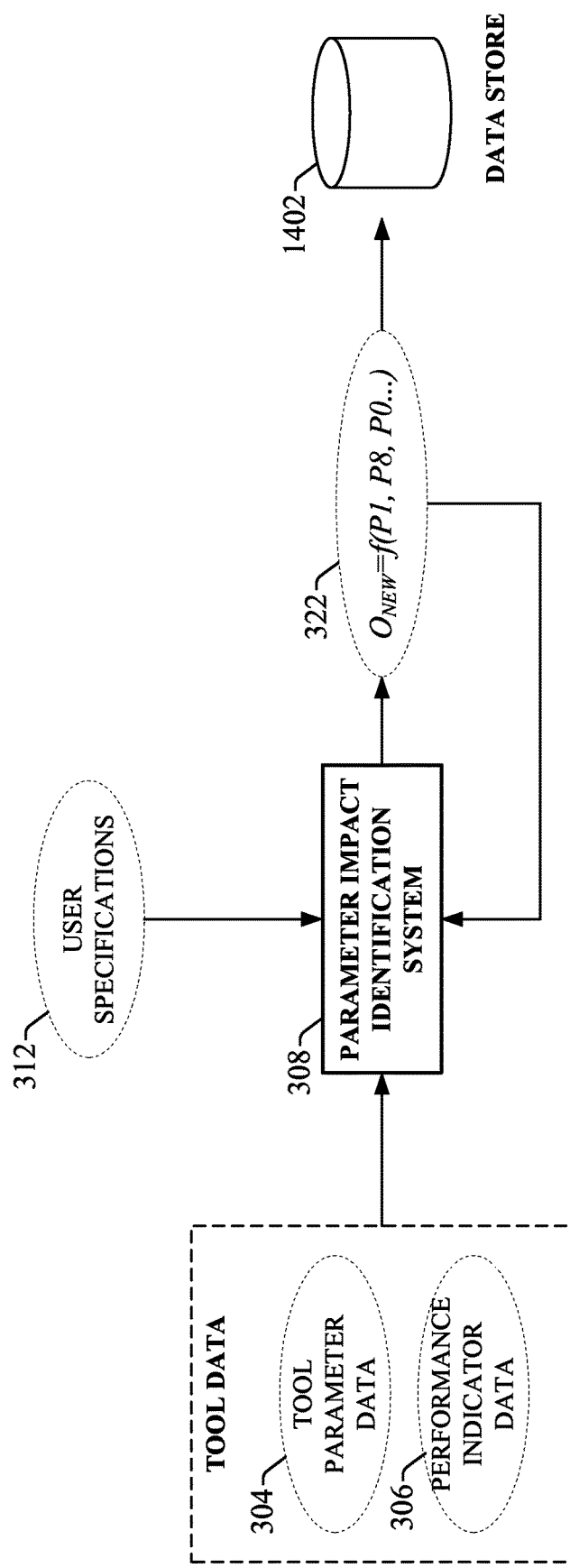
FIG. 14 illustrates updating of tool performance function in a continuously iterative manner.

In some scenarios, the parameter impact identification system 308 may perform a one-time, on-demand calculation of composite function 322 and/or tool parameter rankings for a given set of tool process logs provided to the system (e.g., a set of tool run data provided to the system by a user). However, some embodiments of the parameter impact identification 308 system may also be configured to operate in a continuous iterative manner as new tool data is collected on a substantially real-time basis. This iterative processing is illustrated in FIG. 14. Parameter impact identification system 308 may be configured to receive tool parameter data 304 and tool performance data 306 directly from a semiconductor fabrication system as the new data becomes available (e.g., at the end of each tool run), and iteratively update composite function 322 in view of user specifications 312 based on the new data. Composite function 322 can be maintained in a data store 1402 and used as a basis for a continuously updated model for predicting future tool performance, identifying critical tool parameters affecting tool performance, etc. In addition to recalculating composite function 322, parameter impact identification system 308 can also re-estimate the critical tool parameter rankings as new tool data is received. In this way, parameter sensitivity to tool drift, tool maintenance, and other wear and tear is factored into consideration by virtue of the continuous iterative nature of the individual tool parameter learning.

The parameter impact identification system described herein can autonomously identify and model correlations between tool parameters and tool performance indicators regardless of tool complexity. This is achieved by reducing a large set of potentially relevant tool parameters to a smaller set of critical tool parameters and modeling relationships between these critical parameters and the tool performance indicator. The system is applicable to many types of semiconductor manufacturing tools, including but not limited to plasma etch tools, atomic layer deposition tools, and chemical vapor deposition tools. The system can also be generalized for multiple tool performance outputs (e.g., throughput, downtime, uptime, repair cost, etch bias, deposition thickness, particle count, sidewall angle, etc.).

Figure 15:
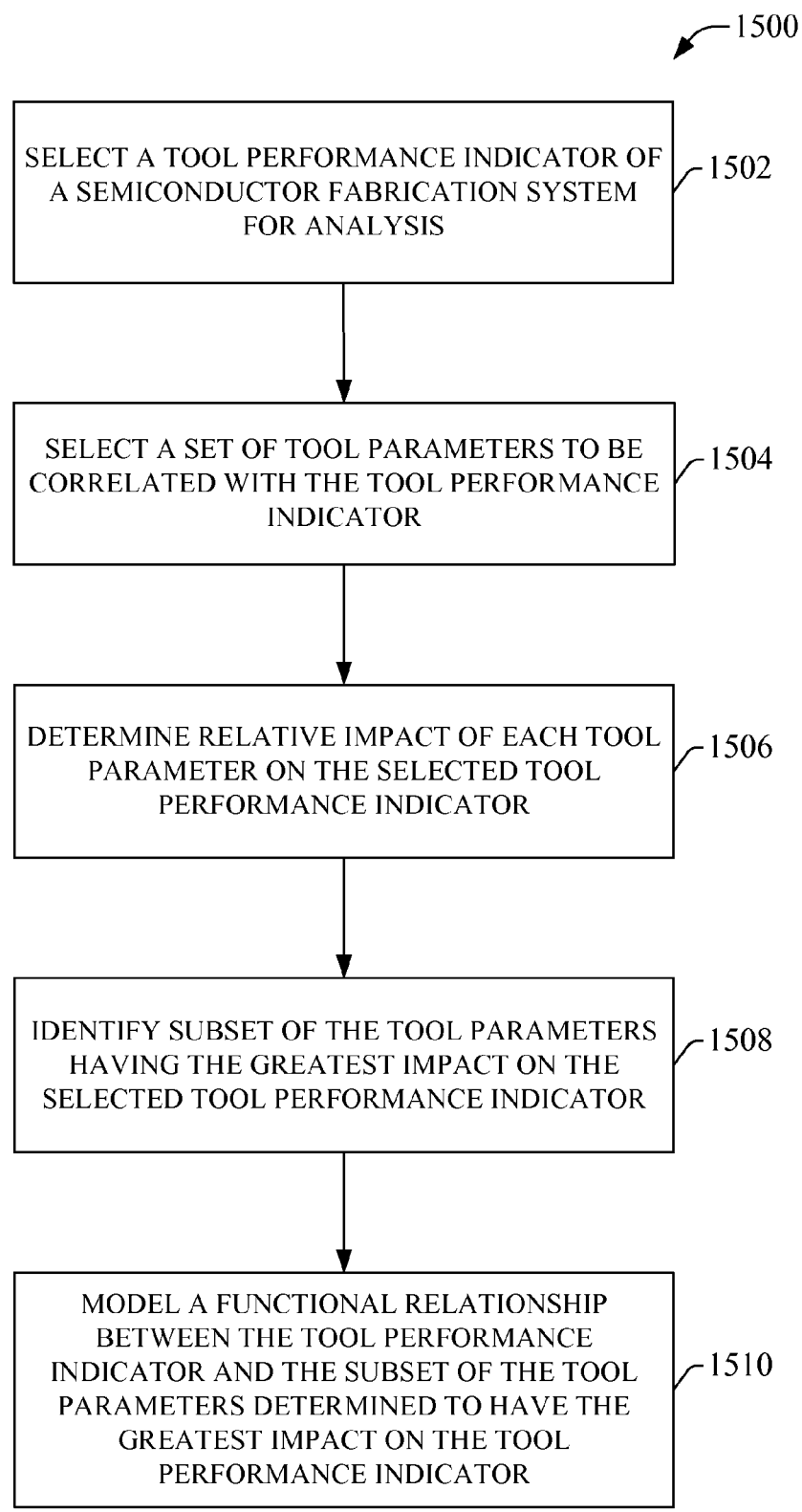
FIG. 15 is a flowchart of an example methodology for modeling a functional relationship between a tool performance indicator and a set of tool parameters of a semiconductor fabrication system.
Figure 16:
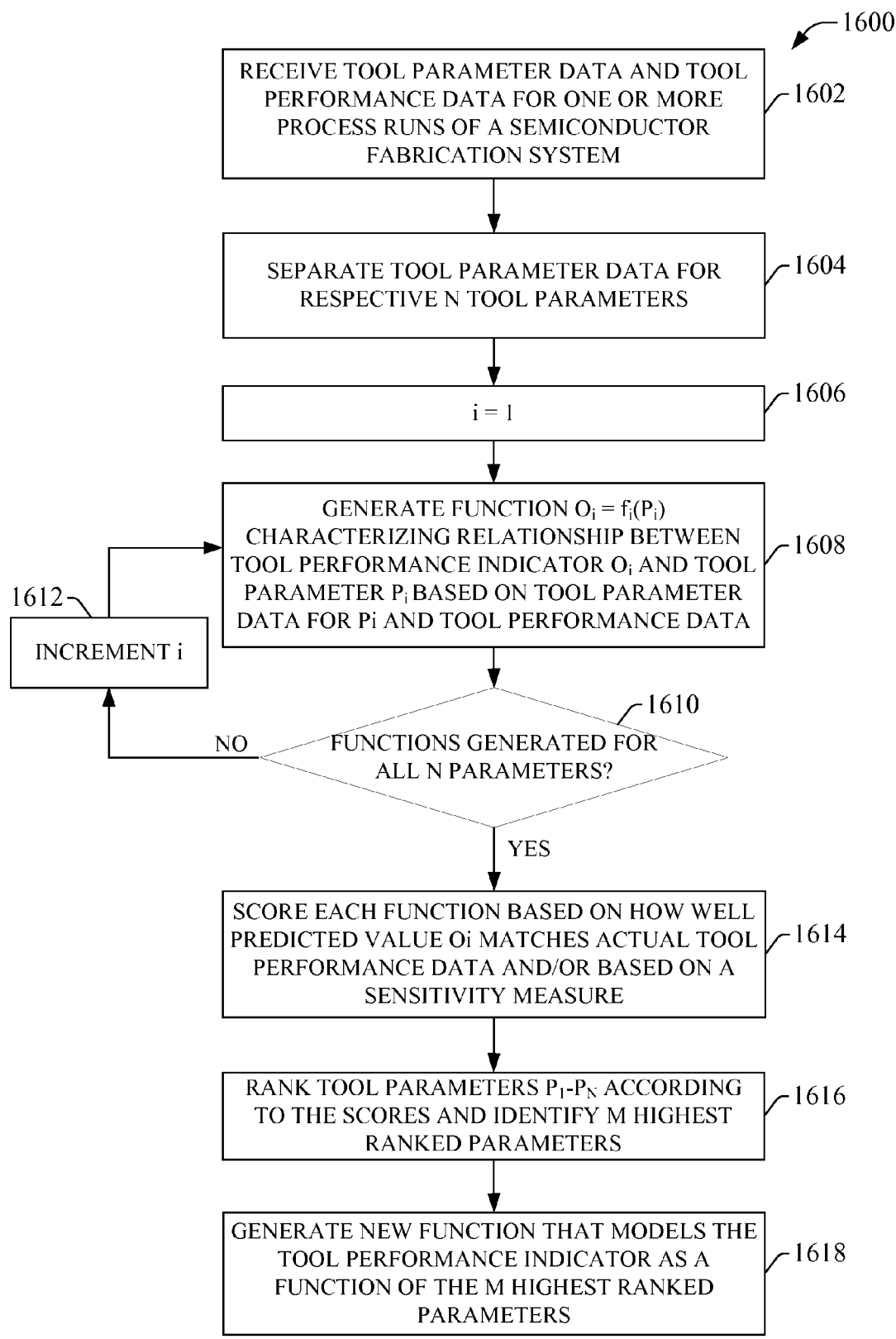
FIG. 16 is a flowchart of an example methodology for autonomously identifying and modeling tool parameter impact on a tool performance metric.

FIGS. 15-16 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 15 illustrates an example methodology 1500 for modeling a functional relationship between a tool performance indicator and a set of tool parameters of a semiconductor fabrication system. Initially, at 1502, a tool performance indicator of a semiconductor fabrication system is selected for analysis. The selected tool performance indicator can represent such tool performance outputs as wafer throughput, system downtime, system uptime, repair costs, etc. The tool performance indicator may also be a particular tool output product characteristic, such as etch bias, deposition thickness, particle count, sidewall angle, etc.

At 1504, a set of tool parameters to be correlated with the tool performance indicator are selected. Exemplary tool parameters can include metrology measurements for one or more manufactured wafers, such as incoming CD, deposited thickness, refractive index of material, etc. The tool parameters can also include sensor readings taken during the manufacturing process (e.g., pressures, temperatures, power, gas flows, etc.) and/or tool operational performance measures (e.g., age of parts on the tools, processing time, set-up times, wafer load and unload times, etc.).

At 1506, the relative impact of each tool parameter on the selected tool performance indicator is determined. The impact of a given tool parameter is a measure of how sensitive the tool performance indicator is to changes in the given tool parameter, or a degree of influence the given tool parameter has over the value of the tool performance indicator. At 1508, a subset of the tool parameters determined to have the greatest impact on the selected tool performance indicator is identified based on the relative impacts determined at step 1506. At 1510, a functional relationship between the tool performance indicator and the subset of tool parameters identified in step 1508 is modeled. This methodology for modeling a semiconductor tool performance indicator can greatly simplify analysis by reducing the number of tool parameters to a smaller set of critical parameters identified as having the greatest influence on the selected performance indicator.

FIG. 16 illustrates an example methodology 1600 for autonomously identifying and modeling tool parameter impact on a tool performance metric. Initially, at 1602, tool parameter data and tool performance data is received. The data can correspond to one or more process runs of a semiconductor fabrication system. The tool parameter data can comprise metrology data measured for one or more manufactured wafers, such as incoming CD, deposited thickness, refractive index of material, etc. Tool parameter data can also comprise sensor readings taken during the manufacturing process (e.g., pressures, temperatures, power, gas flows, etc.) and/or tool operational performance measures (e.g., age of parts on the tools, processing time, set-up times, wafer load and unload times, etc.). Tool performance data can comprise data relating to such tool performance outputs as throughput, downtime, uptime, repair costs, etc. Tool performance data may also include tool output product characteristics, such as etch bias, deposition thickness, particle count, sidewall angle, etc.

At 1604, the tool parameter data is separated for respective N tool parameters. At 1606 a counter i is set to 1. At 1608, a function $O=fi(Pi)$ is generated for an ith tool parameter characterizing a relationship between a tool performance indicator O and the tool parameter Pi. The function can be learned based on the tool parameter data for Pi (separated out at step 1604) and the tool performance data relating to the tool performance indicator.

At 1610, a determination is made as to whether functions have been generated for all N parameters. If it is determined that functions have not been generated for all N parameters, the methodology moves to step 1612, where counter i is incremented, and step 1608 is repeated for the next tool parameter. Alternatively, if it is determined at step 1510 that functions have been generated for all N parameters, the methodology moves to step 1614.

At 1614, each function generated by steps 1608-1610 is scored based on how well the predicted value O matches the actual tool performance data and/or based on a sensitivity measure for the derived function. The sensitivity measure describes a sensitivity of the tool performance indicator to changes in the tool parameter, and can be determined based in part on a numerical or symbolic differential calculated for each function.

At 1616, the N tool parameters are ranked according to the scores determined at 1614, and the M highest ranked tool parameters are identified. These M highest ranked tool parameters represent the subset of the total tool parameters determined to have the greatest impact on the tool performance metric. At 1618, a new function is generated that models the tool performance indicator as a function of the M highest ranked parameters identified at step 1616. This new function can be used to predict future tool performance behavior based on tool parameter trends, assist with scheduling preventative maintenance and identifying where maintenance efforts should be focused, or other such applications.

The various aspects (e.g., in connection with receiving one or more selections, determining the meaning of the one or more selections, distinguishing a selection from other actions, implementation of selections to satisfy the request, and so forth) can employ various artificial intelligence-based schemes for carrying out various aspects thereof. For example, a process for determining if a particular action is a request for an action to be performed or a general action (e.g., an action that the user desires to perform manually) can be enabled through an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of selections, for example, attributes can be identification of a focus chamber and/or a reference chamber and the classes are criteria of the focus chamber and/or reference chamber that need to be utilized to satisfy the request.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to compare chambers, which chambers to compare, what chambers to group together, relationships between chambers, and so forth. The criteria can include, but is not limited to, similar requests, historical information, and so forth.

Figure 17:
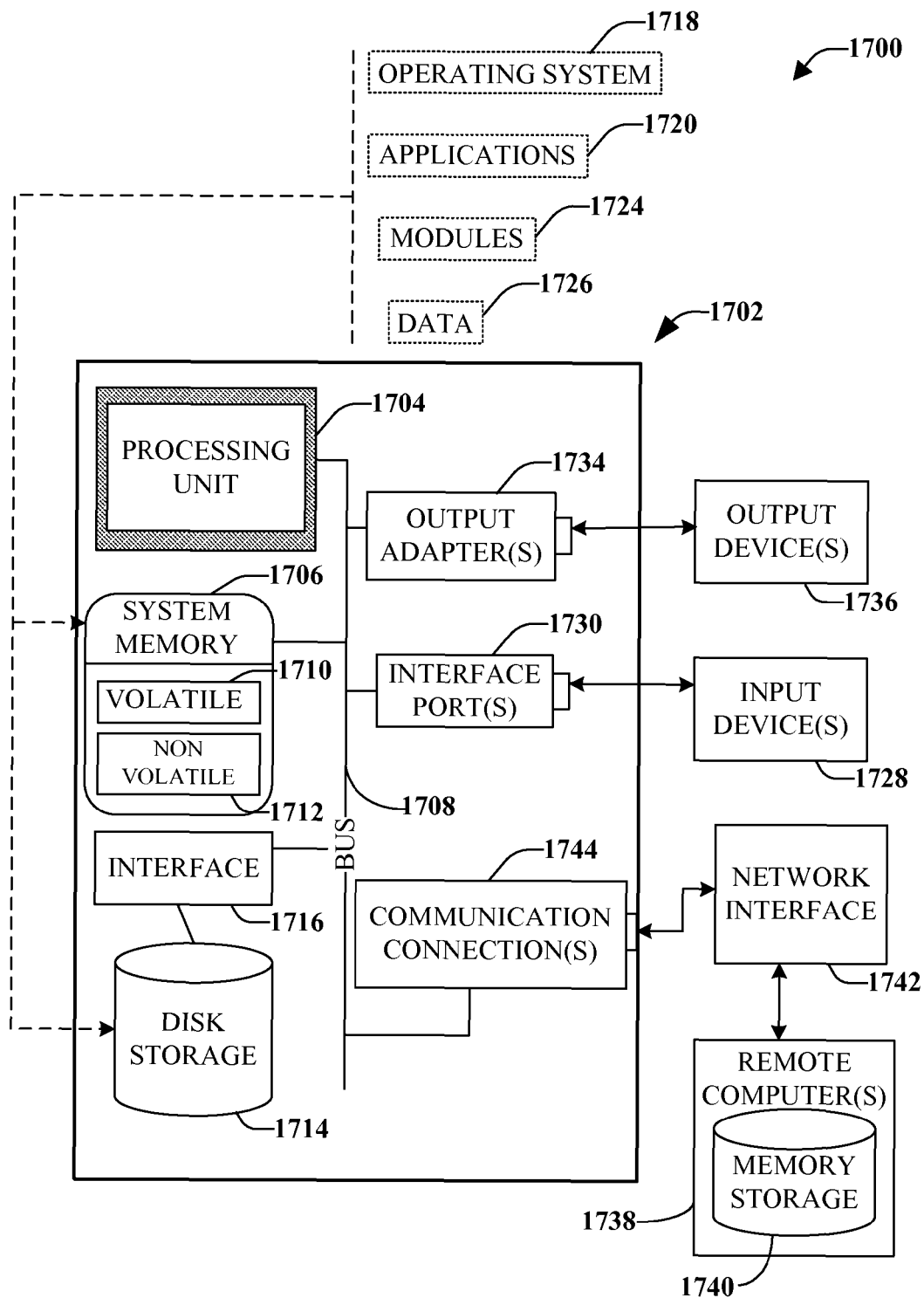
FIG. 17 is an example computing environment.

Referring now to FIG. 17, illustrated is a block diagram of a computer operable to execute the disclosed aspects. In order to provide additional context for various aspects thereof, FIG. 17 and the following discussion are intended to provide a brief, general description of a suitable computing environment 1700 in which the various aspects of the embodiment(s) can be implemented. While the description above is in the general context of computer-executable instructions that may run on one or more computers, those skilled in the art will recognize that the various embodiments can be implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed aspects can be practiced with other computer system configurations, including single-processor or multiprocessor computer systems, minicomputers, mainframe computers, as well as personal computers, hand-held computing devices, microprocessor-based or programmable consumer electronics, micro-controllers, embedded controllers, multi-core processors, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, DRAM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, microwave, RF, infrared and other wireless methods (e.g., IEEE 802.12X, IEEE 802.15.4).

With reference again to FIG. 17, the illustrative computing environment 1700 for implementing various aspects includes a computer 1702, which includes a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1406 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes a disk storage 1714, which can include an internal hard disk drive (HDD) (e.g., EIDE, SATA), which internal hard disk drive may also be configured for external use in a suitable chassis (not shown), a magnetic floppy disk drive (FDD), (e.g., to read from or write to a removable diskette) and an optical disk drive (e.g., reading a CD-ROM disk or, to read from or write to other high capacity optical media such as the DVD). The hard disk drive, magnetic disk drive and optical disk drive can be connected to the system bus 1708 by a hard disk drive interface, a magnetic disk drive interface and an optical drive interface, respectively. The interface 1716 for external drive implementations includes at least one or both of Universal Serial Bus (USB) and IEEE 1094 interface technologies. Other external drive connection technologies are within contemplation of the various embodiments described herein.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the disclosed aspects.

A number of program modules can be stored in the drives and RAM, including an operating system 1718, one or more application programs 1720, other program modules 1724, and program data 1726. All or portions of the operating system, applications, modules, and/or data can also be cached in the RAM. It is to be appreciated that the various embodiments can be implemented with various commercially available operating systems or combinations of operating systems.

A user can enter commands and information into the computer 1702 through one or more wired/wireless input devices 1728, such as a keyboard and a pointing device, such as a mouse. Other input devices (not shown) may include a microphone, an IR remote control, a joystick, a game pad, a stylus pen, touch screen, or the like. These and other input devices are often connected to the processing unit 1704 through an input device (interface) port 1730 that is coupled to the system bus 1708, but can be connected by other interfaces, such as a parallel port, an IEEE 1094 serial port, a game port, a USB port, an IR interface, etc.

A monitor or other type of display device is also connected to the system bus 1708 via an output (adapter) port 1734, such as a video adapter. In addition to the monitor, a computer typically includes other peripheral output devices 1736, such as speakers, printers, etc.

The computer 1702 may operate in a networked environment using logical connections via wired and/or wireless communications to one or more remote computers, such as a remote computer(s) 1738. The remote computer(s) 1738 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1740 is illustrated.

The remote computer(s) can have a network interface 1742 that enables logical connections to computer 1702. The logical connections include wired/wireless connectivity to a local area network (LAN) and/or larger networks, e.g., a wide area network (WAN). Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network through a wired and/or wireless communication network interface or adapter (communication connection(s)) 1744. The adaptor 1744 may facilitate wired or wireless communication to the LAN, which may also include a wireless access point disposed thereon for communicating with the wireless adaptor.

When used in a WAN networking environment, the computer 1702 can include a modem, or is connected to a communications server on the WAN, or has other means for establishing communications over the WAN, such as by way of the Internet. The modem, which can be internal or external and a wired or wireless device, is connected to the system bus 1708 via the serial port interface. In a networked environment, program modules depicted relative to the computer 1702, or portions thereof, can be stored in the remote memory/storage device 1740. It will be appreciated that the network connections shown are illustrative and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 18:
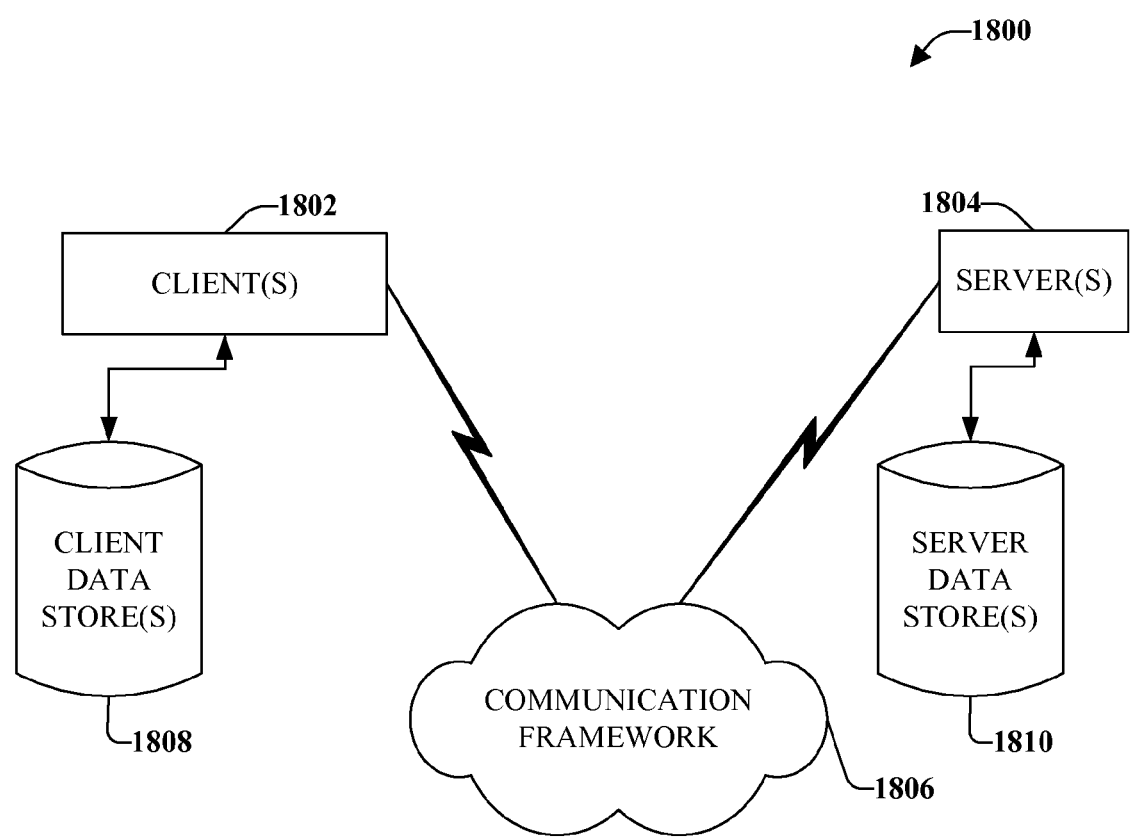
FIG. 18 is an example networking environment.

Referring now to FIG. 18, there is illustrated a schematic block diagram of an illustrative computing environment 1800 for processing the disclosed architecture in accordance with another aspect. The computing environment 1800 includes one or more client(s) 1802. The client(s) 1802 can be hardware and/or software (e.g., threads, processes, computing devices). The client(s) 1802 can house cookie(s) and/or associated contextual information in connection with the various embodiments, for example.

Computing environment 1800 also includes one or more server(s) 1804. The server(s) 1804 can also be hardware and/or software (e.g., threads, processes, computing devices). The servers 1804 can house threads to perform transformations in connection with the various embodiments, for example. One possible communication between a client 1802 and servers 1804 can be in the form of a data packet adapted to be transmitted between two or more computer processes. The data packet may include a cookie and/or associated contextual information, for example. Computing environment 1800 includes a communication framework 1806 (e.g., a global communication network such as the Internet) that can be employed to facilitate communications between the client(s) 1802 and the server(s) 1804.

Communications can be facilitated via a wired (including optical fiber) and/or wireless technology. The client(s) 1802 are operatively connected to one or more client data store(s) 1808 that can be employed to store information local to the client(s) 1802 (e.g., cookie(s) and/or associated contextual information). Similarly, the server(s) 1804 are operatively connected to one or more server data store(s) 1810 that can be employed to store information local to the servers 1804.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via a flowchart, it can be appreciated that various other branches, flow paths, and orders of the blocks, may be implemented which achieve the same or a similar result. Moreover, not all illustrated blocks may be required to implement the methodologies described herein.

The invention claimed is:

1. A system, comprising:
   at least one non-transitory computer-readable medium having stored therein computer-executable components; and
   at least one processor that executes the following computer-executable components stored on the at least one non-transitory computer readable medium:
      a parameter separation component configured to:
         determine a plurality of tool parameters that impact a tool performance indicator associated with a tool in a semiconductor fabrication system; and
         for each tool parameter of the tool parameters, generate a distinct function that characterizes a behavior of the tool performance indicator in terms of the tool parameter;
      a quality scoring component configured to determine respective quality scores for the functions, wherein a quality score indicates how closely the associated function predicts an actual value far the tool performance indicator;
      a sensitivity component configured to determine respective sensitivity scores for the functions, wherein a sensitivity score is a measure of sensitivity of the tool performance indicator to changes in values of the tool parameter associated with the function, and wherein the sensitivity component, based on identification of an upper operating limit and a lower operating limit for at least one tool parameter associated with at least one function, only employs a portion of a differential curve for the at least one tool parameter between the upper operating limit and the lower operating limit to determine at least one sensitivity score for the at least one function;
      a ranking component configured to generate respective composite scores for the functions, wherein a composite score for the function comprises the quality score for the function weighted by a weighting factor based on the sensitivity score for the function;
      a filtering component configured to identify a subset of the tool parameters having a defined impact on the tool performance indicator based on the respective composite scores; and
      an interface component configured to provide, to a real-time early warning system, an output that initiates the real-time early warning system to generate a preventative maintenance warning based on the output, wherein the preventative maintenance warning comprises guidance on a maintenance effort on which to focus for keeping the tool performance indicator within a desired operating limit based on the subset of the tool parameters.

2. The system of claim 1, wherein the sensitivity component is further configured to determine the respective sensitivity scores for the functions based in part on respective differential curves determined for the functions.

3. The system of claim 1, wherein the interface component is further configured to receive input data specifying at least one of a first number of highest ranking tool parameters to maintain as the subset of the tool parameters or a second number of lowest ranking tool parameters to eliminate to yield the subset of the tool parameters.

4. The system of claim 3, wherein the interface component is further configured to render the subset of the tool parameters on a display device.

5. The system of claim 1, wherein the parameter separation component is further configured to generate the functions based on tool parameter data and tool performance data measured for one or more process runs of the semiconductor fabrication system.

6. The system of claim 1, further comprising a composite function component configured to generate a composite function that characterizes the tool performance indicator in terms of the subset of the tool parameters.

7. The system of claim 6, wherein the composite function component is further configured to iteratively update the composite function based on at least one of new tool parameter data or new tool performance data.

8. A method, comprising:
   determining, by a system comprising a processor, a plurality of tool parameters that impact a tool performance indicator associated with a tool in a semiconductor fabrication system;

for each tool parameter of the tool parameters, generating a distinct function that characterizes a non-linear relationship between the tool performance indicator and the tool parameter;

assigning, by the system, respective quality scores to the functions, wherein a quality score indicates how closely an output of the function matches an actual value of the tool performance indicator;

assigning, by the system, respective sensitivity scores to the functions, wherein a sensitivity score is a measure of how sensitive the tool performance indicator is to changes in values of the tool parameter associated with the function, and wherein assigning a sensitivity score comprises, based on identification of an upper operating limit and a lower operating limit for at least one tool parameter associated with at least one function, only employing a portion of a differential curve for the at least one tool parameter between the upper operating limit and the lower operating limit to determine at least one sensitivity score for the at least one function;

assigning, by the system, respective composite scores to the functions, wherein a composite score comprises the quality score for the function weighted by a weighting factor based on the sensitivity score for the function; and identifying, by the system, a subset of the tool parameters determined to have a critical degree of influence on the tool performance indicator based on the respective composite scores; and providing, by the system to a real-time early warning system, an output that initiates the real-time early warning system to generate a preventative maintenance warning based on the output, wherein the preventative maintenance warning comprises guidance on a maintenance effort on which to focus for keeping the tool performance indicator within a desired operating limit based on the subset of the tool parameters.

9. The method of claim 8, wherein the assigning respective sensitivity scores comprises:
determining the respective sensitivity scores for the functions based on respective differential curves determined for the functions.

10. The method of claim 8, the operations further comprising deriving a composite function characterizing a relationship between the tool performance indicator and the subset of the tool parameters.

11. The method of claim 10, the operations further comprising iteratively updating the composite function in accordance with at least one of new tool parameter data or new tool performance data.

12. A non-transitory computer-readable medium having stored thereon computer-executable instructions that, in response to execution, cause a system including a processor to perform operations comprising:
determining a plurality of tool parameters that impact a tool performance indicator associated with a tool in a semiconductor fabrication system;
for each tool parameter of the tool parameters, generating a distinct function that describes a correlation between the tool parameter and the tool performance indicator;

determining respective quality scores for the functions, wherein a quality score indicates how accurately the function predicts an actual value of the tool performance indicator;

determining respective sensitivity scores for the functions, wherein a sensitivity score indicates a sensitivity of the tool performance indicator to changes in values of the tool parameter associated with the function, and wherein determining a sensitivity score comprises, based on identification of an upper operating limit and a lower operating limit for at least one tool parameter associated with at least one function, only employing a portion of a differential curve for the at least one tool parameter between the upper operating limit and the lower operating limit to determine at least one sensitivity score for the at least one function;

generating respective composite scores for the functions, wherein a composite score comprises the quality score for the function weighted by a weighting factor based on the sensitivity score for the function;

selecting a subset of the tool parameters determined to have a defined impact on the tool performance indicator based on the respective composite scores; and providing, by the system to a real-time early warning system, an output that initiates the real-time early warning system to generate a preventative maintenance warning based on the output, wherein the preventative maintenance warning comprises guidance on a maintenance effort on which to focus for keeping the tool performance indicator within a desired operating limit based on the subset of the tool parameters.

13. The computer-readable medium of claim 12, wherein the determining the respective sensitivity scores for the functions comprises determining respective differential curves for the functions.

14. The computer-readable medium of claim 12, wherein the operations further comprise generating a composite function that characterizes the tool performance indicator in terms of the subset of the tool parameters.

15. The computer-readable medium of claim 14, wherein the operations further comprise iteratively updating the composite function based on at least one of tool parameter data or tool performance data measured for one or more process runs of a semiconductor fabrication system.

16. The computer-readable medium of claim 12, wherein the operations further comprise receiving input data specifying at least one of a number of highest ranking tool parameters to maintain as the subset of the tool parameters or a number of lowest ranking tool parameters to eliminate to yield the subset of the tool parameters.

17. The computer-readable medium of claim 12, wherein the generating the set of functions comprises generating the set of functions based on tool parameter data and tool performance data measured for one or more process runs of the semiconductor fabrication system.

18. The method of claim 8, further comprising receiving input data specifying at least one of a number of highest ranking tool parameters to maintain as the subset of the tool parameters or a number of lowest ranking tool parameters to eliminate to yield the subset of the tool parameters.

19. The method of claim 8, further comprising rendering the subset of the tool parameters on a display device.

* * * * *